US012727701B2

(12) United States Patent
Wade et al.

(10) Patent No.: US 12,727,701 B2
(45) Date of Patent: Sep. 8, 2026

(54) SYSTEMS AND METHODS FOR STEAM HEATING

(71) Applicant: Electrolux Home Products, Inc., Charlotte, NC (US)

(72) Inventors: Laura Wade, Portland, TN (US); Steven M. Swayne, Springfield, TN (US); Anna Cortez, Goodlettsville, TN (US)

(73) Assignee: ELECTROLUX CONSUMER PRODUCTS, INC., Charlotte, NC (US)

(*) Notice: Subject to any disclaimer, the term of this patent is extended or adjusted under 35 U.S.C. 154(b) by 1070 days.

(21) Appl. No.: 17/545,445

(22) Filed: Dec. 8, 2021

(65) Prior Publication Data

US 2023/0172383 A1 Jun. 8, 2023

(51) Int. Cl.

*A47J 27/04* (2006.01)
*A23L 5/10* (2016.01)
*A47J 27/00* (2006.01)
*A47J 36/32* (2006.01)
*F24C 15/00* (2006.01)

(52) U.S. Cl.

CPC ................. *A47J 27/04* (2013.01); *A23L 5/13* (2016.08); *A47J 27/002* (2013.01); *A47J 36/32* (2013.01); *F24C 15/003* (2013.01); *A47J 2027/043* (2013.01)

(58) Field of Classification Search

None

See application file for complete search history.

(56) References Cited

U.S. PATENT DOCUMENTS 6,465,762 B1 * 10/2002 Swayne ................. A21C 13/00 219/400
6,619,189 B1 9/2003 Tippmann et al.
6,727,478 B2 * 4/2004 Rael ..................... H05B 6/6402 126/337 R
2006/0251784 A1 * 11/2006 Sells ........................ A21B 3/04 426/510
2006/0251785 A1 * 11/2006 Fraccon ................... A21B 1/14 426/510
2007/0104844 A1 * 5/2007 Fraccon ................... A21B 3/04 426/496
2009/0011101 A1 1/2009 Doherty et al.

(Continued)

FOREIGN PATENT DOCUMENTS

DE 102014223772 5/2016
EP 1719414 11/2006

(Continued)

OTHER PUBLICATIONS

International Search Report and Written Opinion for PCT/US2022/050853 dated Mar. 16, 2023, 26 pages.

*Primary Examiner* — John J Norton
(74) *Attorney, Agent, or Firm* — Chrisman Gallo Tochtrop LLC

(57) ABSTRACT

Systems and methods are provided to operate, by a processor coupled to memory, a steam heating mode including selective control of a bake heating element and two or more fans according to preset and timed duty cycles of a plurality of heating stages comprising preset requirements for transitions therebetween based on received input; and heat, based on the operation, one or more food items via steam.

20 Claims, 11 Drawing Sheets

(56) References Cited

U.S. PATENT DOCUMENTS

| | | | | |
|---|---|---|---|---|
| 2009/0250452 | A1 | 10/2009 | Tse | |
| 2015/0354827 | A1* | 12/2015 | Faraldi | A47J 27/04 219/403 |
| 2017/0276378 | A1* | 9/2017 | Faraldi | F24C 15/327 |
| 2017/0343221 | A1 | 11/2017 | Swayne et al. | |
| 2018/0035698 | A1* | 2/2018 | McNerney | A23L 5/17 |
| 2018/0299138 | A1* | 10/2018 | Faraldi | F24C 15/2007 |
| 2020/0096202 | A1 | 3/2020 | Guida et al. | |
| 2020/0229639 | A1* | 7/2020 | Swayne | A47J 37/0641 |
| 2021/0298512 | A1* | 9/2021 | Zhang | A47J 27/04 |
| 2022/0325902 | A1* | 10/2022 | Suenaga | H05B 6/6485 |
| 2023/0210146 | A1* | 7/2023 | Sun | F24C 7/085 426/510 |

FOREIGN PATENT DOCUMENTS

| | | |
|---|---|---|
| EP | 1741986 | 1/2007 |
| EP | 2389044 | 11/2011 |
| EP | 3165134 | 5/2017 |
| JP | 2006230434 | 9/2006 |
| JP | 4607649 | 11/2006 |

* cited by examiner

| Steam Heat Cycling Configuration | | | | |
| --- | --- | --- | --- | --- |
| Stage No. | Element | ON Time | ON AT | OFF AT |
| Stage 1 | Bake | 40 | 0 | 40 |
| | Broil | 0 | 0 | 0 |
| | Convect | 20 | 40 | 60 |
| | Transition | 4:30 | - | - |
| | Transition | temp >= setpoint | - | - |
| Stage 2 | Bake | 30 | 0 | 30 |
| | Broil | 15 | 30 | 45 |
| | Convect | 15 | 45 | 60 |
| | Transition | temp >= setpoint | - | - |
| Stage 3 | Bake | 60 | 0 | 60 |
| | Broil | 0 | 0 | 0 |
| | Convect | 0 | 0 | 0 |
| | Transition | 5:00 | - | - |
| Stage 4 | Bake | 15 | 0 | 15 |
| | Broil | 15 | 15 | 30 |
| | Convect | 30 | 30 | 60 |
| | Transition | 20:00 | - | - |
| Stage 5 | Bake | 20 | 0 | 20 |
| | Broil | 15 | 20 | 35 |
| | Convect | 25 | 35 | 60 |
| | Transition | None | - | - |

| Steam Heat Cycling Configuration | | | | |
|---|---|---|---|---|
| **Stage No.** | **Element** | **ON Time** | **ON AT** | **OFF AT** |
| **Stage 1** | Bake | 30 | 0 | 30 |
| | Broil | 30 | 30 | 60 |
| | Convect | 0 | 0 | 0 |
| | Transition | 4:30 | - | - |
| | Transition | temp >= setpoint | - | - |
| **Stage 2** | Bake | 30 | 0 | 30 |
| | Broil | 15 | 30 | 45 |
| | Convect | 15 | 45 | 60 |
| | Transition | temp >= setpoint | - | - |
| **Stage 3** | Bake | 15 | 45 | 60 |
| | Broil | 15 | 30 | 45 |
| | Convect | 30 | 0 | 30 |
| | Transition | temp <= setpoint | - | - |
| **Stage 4** | Bake | 15 | 0 | 15 |
| | Broil | 15 | 15 | 30 |
| | Convect | 30 | 30 | 60 |
| | Transition | None | - | - |

| Steam Heat Cycling Configuration | | | | |
|---|---|---|---|---|
| Stage No. | Element | ON Time | ON AT | OFF AT |
| Stage 1 | Bake | 30 | 0 | 30 |
| | Broil | 0 | 0 | 0 |
| | Convect | 30 | 0 | 30 |
| | Transition | 4:30 | - | - |
| | Transition | temp >= setpoint | - | - |
| Stage 2 | Bake | 40 | 0 | 40 |
| | Broil | 20 | 40 | 60 |
| | Convect | 20 | 40 | 60 |
| | Transition | temp >= setpoint | - | - |
| Stage 3 | Bake | 30 | 0 | 30 |
| | Broil | 0 | 0 | 0 |
| | Convect | 30 | 0 | 30 |
| | Transition | 5:00 | - | - |
| Stage 4 | Bake | 10 | 0 | 10 |
| | Broil | 10 | 0 | 10 |
| | Convect | 40 | 20 | 60 |
| | Transition | 20:00 | - | - |
| Stage 5 | Bake | 20 | 0 | 20 |
| | Broil | 20 | 20 | 40 |
| | Convect | 20 | 0 | 20 |
| | Transition | None | - | - |

SYSTEMS AND METHODS FOR STEAM HEATING

TECHNICAL FIELD

The present disclosure relates to steam heating, and more particularly, to systems and methods for reheating of a variety of types of food items by a controlled steam heating mode.

BACKGROUND

Reheating of food can be done by, for example, a microwave but this presents numerous deficiencies. For example, the reheating by the microwave may diminish the food quality, resulting in a hard, rubbery, soggy, and non-crispy quality. These and other deficiencies exist.

BRIEF SUMMARY

Embodiments of the present disclosure provide a cooking apparatus including a processor and a memory coupled to the processor. The processor may be configured to operate, based on received input, a steam heating mode including selective control of a bake heating element and two or more fans according to preset and timed duty cycles of a plurality of heating stages comprising preset requirements for transitions therebetween. The processor may be configured to heat, based on the operation, one or more food items via steam.

Embodiments of the present disclosure provide a method of steam heating. The method may include operating, by a processor, a steam heating mode including selectively controlling a bake heating element and two or more fans according to preset and timed duty cycles of a plurality of heating stages comprising preset requirements for transitions therebetween based on received input. The method may include heating, by the processor, one or more food items via steam based on the operation.

Embodiments of the present disclosure provide a computer readable storage medium comprising computer program code instructions, being executable by a computer, for: operating a steam heating mode including selective control of a bake heating element and two or more fans according to preset and timed duty cycles of a plurality of heating stages comprising preset requirements for transitions therebetween based on received input; and heating, based on the operation, one or more food items via steam.

BRIEF DESCRIPTION OF THE DRAWINGS

FIG. 2 depicts a table for cycling components of a steam heating system according to an example embodiment.

FIG. 4 depicts a table for cycling components of a steam heating system according to another example embodiment.

FIG. 11 depicts a table for cycling components of a steam heating system according to another example embodiment.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Systems and methods disclosed herein are implemented to heat foods for optimal results using a steam heating mode. The steam heating mode can be used, for example, for reheating foods. In particular, the mode utilizes direct steam, in which water is input into a portion, such as the bottom portion, of an oven cavity. For example, the water is poured into the bottom of the cavity prior to starting the oven. In this manner, pre-pouring of water into a sump pump or a separate water container of the oven where water is pumped to a steam generator to induce steam flow into the oven cavity prior to operation of the steam heating mode, which is then vaporized therein via a hidden-bake element. As a consequence of application of the steam heating mode, one or more elements may be cycled to reheat the food to a safe reheating temperature, optimal reheat texture, and in an acceptable time for a user. Thus, improved quality of reheated food is provided.

The systems and methods disclosed herein enables a mode selection that allows the user to reach a safe reheat temperature and optimized interior and exterior texture. The systems and methods may be implemented in an oven, such as a wall oven. The systems and methods may also be implemented as a freestanding system. In addition, the systems and methods disclosed herein may be configured for, without limitation, electric-only ranges, gas-ranges, or ranges with hybrid gas and electric elements. Without limitation, the foods may include pizza, lasagna, or the like. In some examples, the steam heating mode may function as a reheat mechanism for already cooked food and to supply a just-cooked-out-of-the-oven texture, including but not limited to, a crispy crust and melted cheese.

Figure 1:
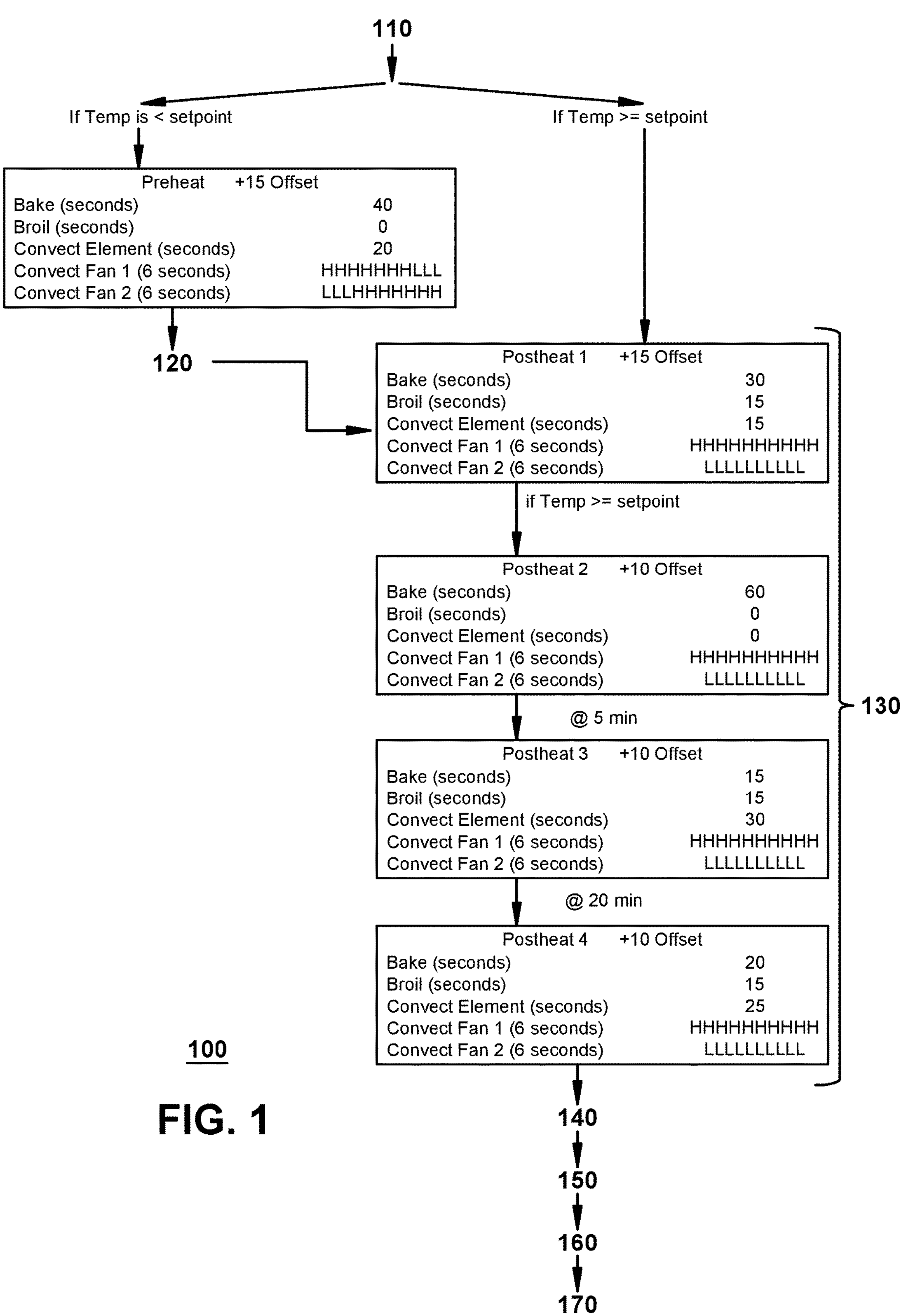
FIG. 1 illustrates operation of a steam heating system according to an example embodiment.

FIG. 1 illustrates operation of a cooking apparatus, such as a steam heating system 100, according to an example embodiment. The steam heating system 100 comprises a processor, a memory, and the processor may be configured to control a first convection fan, a second convection fan, a first element, a second element, and a third element. In some examples, the first element, the second element, and the third element may each include a heating element, as further described below. The memory may be a read-only memory, write-once read-multiple memory or read/write memory, e.g., RAM, ROM, and EEPROM, and the steam heating system 100 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and reprogramed many times after leaving the factory. It may also be read many times.

The first element may include a convection element. The second element may include a broil element. The third element may include a bake element. The first, second, and third heating elements may be, for example, electrical resistance heating elements. The first convection fan may be independently controlled from the second convection fan. The dual convection fans may be run simultaneously together in one or more heating stages and/or separately in one or more heating stages. In any number of the stages, either fan may run at H or L speeds, switching between the speeds, and the dual fans may run at different speeds simultaneously or separately. Without limitation, and by way of example, the first convection fan and the second convection fan may be configured to operate together at a single speed, such as a High H speed or a Low L speed, for any given time duration. A dedicated steam heating mode may be optimized in a particular appliance to execute, by the processor, the steam heating algorithm that utilizes one or more of the broil and convection elements to condition the cooking cavity, in addition to the hidden-bake element used to vaporize water. Regarding the three heating elements, all three may be run in a single stage, and the broil element may be full-time off during preheat. In some examples, two elements may be configured by the processor to operate simultaneously in any preheat and/or postheat stage.

As will be observed, preheating may be broken into a stage wherein the hidden-bake element, responsible for driving evaporation of steam, is operative at least half of the respective duty cycle, with other elements operative the remainder of the respective duty cycle. Whereas, during the postheat stages, initially the hidden-bake element is operative full-time (full duty cycle), and then is reduced to less on-time during subsequent postheat stages. Notably, in none of the stages is the bake element inoperative during the full stage. The preheat stages share a common first (preheat) offset, which is a variation that may include a first predetermined temperature range including a first value and a second value or a first predetermined percentage range, such as a first percentage value and a second percentage value, whereas the postheat stages share a common second (postheat) offset, which is a variation that may include a second predetermined temperature range including a third value and a fourth value or a second predetermined percentage range, such as a third percentage value and a fourth percentage value, wherein the stage actually targets a target temperature equal to the user selected setpoint plus the associated stage offset. While the first predetermined temperature range may differ from the second predetermined temperature range, the first predetermined percentage range may be the same or different from the second predetermined percentage range. Moreover, during the postheat stages the target temperature (including offset) is targeted via a PID algorithm that oscillates between upper- and lower-bound temperatures around the target temperature, for example plus (+) 10 degrees and minus (−) 5 degrees, in effect emulating hysteresis control about the target temperature.

A cooking oven is provided with a sump at its base to hold water. A hidden-bake element disposed beneath the bottom wall of the sump, such as the bottom wall of the cooking cavity, then is used to deliver thermal energy to the water therein, to vaporize it to steam. More particularly, the hidden-bake element is operative for a given time period during preheating stage, where it is effective to heat water in the sump to generate steam. The steam may then be circulated in the oven cavity, via natural and/or forced convection, as a medium to deliver thermal energy to pre-cooked foods to reheat them by operation of the selected steam heating mode. The broil element may be disposed at an upper portion of the cooking cavity, and the convection system (convection element and fan) may be disposed at the center of a rear wall.

At 110, water may be added to the cavity bottom. In some examples, water should be added to a cold cavity, that is the cavity before it is heated, in order to eliminate early vaporization or damage to the oven bottom. The steam heating mode may be selected by activation of a button or via a touch panel screen so as to operate the oven accordingly. For example, the algorithm may be optimized by the processor for different food products having different heat absorption characteristics. This algorithm, or group of algorithms, may be called up for implementation by the processor via input comprising: (i) a user-selected, dedicated steam heating mode, (ii) a dedicated control input such as a touch button, or (iii) a menu system on a dynamic touchscreen input device. The processor may be configured to evaluate the temperature with reference to a setpoint. Based on the selection of the steam heating mode, at least one of a plurality of conditions may be triggered by the processor based on the existing temperature status of the oven.

Under either condition, food is added to the oven at the indication of a preheat signal, and thereafter heated in the oven up to a safe reheating temperature and/or recommended time period without causing burning of the food and/or adversely impacting the texture of the food, in which the oven cycles through the one or more elements to achieve a setpoint. In some examples, the indication may comprise a visual indication, an audible indication, and/or any combination thereof. Moreover, the only user input into the steam heating mode is the desired final temperature. Once that mode is selected to reflect the desired final temperature, steam is generated according to predetermined parameters that are fixed and not user-selectable. Thus, a user is not permitted to input a desired level of steam.

Under a first condition, if the oven is cold due to non-use, a preheating process begins and the oven may be controlled by the processor such that it begins preheating up to a predetermined temperature and/or a predetermined time. For example, as depicted at 120 of FIG. 1, the oven may begin preheating for 4 minutes and 30 seconds. In this manner, if the processor evaluates that the temperature is lower than a setpoint, it may trigger preheating. As indicated in the preheating stage, the bake element, broil element, and convection element are shown to be on for the given duration, and the first and second convection fans are shown to be on at different fan speeds (such as High H or Low L) every 6 seconds up to 60 seconds, as further described below with respect to FIG. 2. In some examples, the first convection fan and the second convection fan may be configured to operate together at a single speed, such as a High H speed or Low L speed. It is understood that the time when the first and second convection fans are on is not limited to such a duration, and that other time durations and cycle times may be used. Thus, the preheat stage will transition directly to the postheat stage once the commonly defined preheat temperature has been reached. In addition, during the preheat stage, all heaters in the oven may be energized by the processor to achieve a desired temperature. Further, the processor may be configured to maintain a desired temperature for a predetermined time by energizing and/or de-energizing a heater.

Under a second condition, if the oven is already heated, the oven may be controlled by the processor such that it may be heated with the one or more components of the system deemed appropriate and in accordance with a cooking configuration to reach the next transition point. In this manner, if the processor evaluates that the temperature is greater than or equal to a setpoint, it may trigger postheating stages, as collectively shown at 130. As indicated in the postheating stages 130, the bake element, broil element, and convection element are shown to be on for the given duration, and the first and second convection fans are shown to be on at different fan speeds (such as High H or Low L) every 6 seconds up to 60 seconds, as further described below with respect to FIG. 2. In some examples, the first convection fan and the second convection fan may be configured to operate together at a single speed, such as a High H speed or Low L speed, every 6 seconds up to 60 seconds. It is understood that the time when the first and second convection fans are on is not limited to such a duration, and that other time durations and cycle times may be used.

At 140, the door is opened at the conclusion of the fourth postheating stage. At 150, food contents are removed. At 160, the door is thereafter closed. At 170, the steam heating mode concludes by either resetting to its initial state or powering off.

As will be further described below, the thermal energy from the specific cycling of one or more components of the system within and between transitions from different stages generates the requisite steam for heating. More particularly, steam is generated according to predetermined duty cycles in different stages, with only the temperature setpoint being input by the user.

The processor may be configured to control steam heating in accordance with the systems and methods described herein. The processor may be configured to control one or more components of the system to implement the steam heating mode to, for example, reheat one or more foods. The processor may be configured to control a bake heating element of the system. For example, the processor may be configured to operate the bake heating element to provide a majority of heat output during one or more preheat stages and/or one or more postheat stages.

The processor may be configured to control a bake element of the system. For example, the processor may be configured to operate a bake element of the system to provide all of the heat during an initial postheat stage after notification for insertion of the food item to be reheated. In another example, the processor may be configured to operate the bake element of the system to provide a majority of the heat during the initial postheat stage after notification for insertion of the food item to be reheated.

The processor may be configured to control the first convection fan and the second convection fan for the entire duration of the steam heating. In some examples, the processor may be configured to operate the first and second convection fans continuously for the entire duration of the steam heating and/or at different speeds from each other. For example, the processor may be configured to operate the first convection fan and the second convection fan together at a single speed, such as a High H speed or Low L speed, every 6 seconds up to 60 seconds. It is understood that the time when the first and second convection fans are on is not limited to such a duration, and that other time durations and cycle times may be used. The processor may be configured to operate the bake heating element during each predetermined duty cycle of the steam heating process.

The stages may target a predetermined temperature and an associated preheat and postheat offset, in which the offsets may be different from each other. In some examples, the stages may target a user-selected temperature, thereby instructing the processor via selection of the steam heating mode to operate the specific cycling of the one or more components of the system. In addition, all postheat duty cycles may be operated by the processor according to hysteresis control using one or more predetermined temperature parameters. For example, the predetermined temperature parameter may comprise upper and lower temperatures, as explained above. Moreover, during each of the postheat stages, the duty cycle is operated via PID control between upper and lower bounds bracketing a desired 'setpoint' temperature so that the temperature profile oscillates between the bounds.

FIG. 2 illustrates a table 200 for cycling components of a steam heating system according to an example embodiment. FIG. 2 may reference and incorporate any components of the steam heating system 100 of FIG. 1. As depicted in table 200, numerous heating stages and components of the system are utilized to reheat the food item(s) through application of the selected steam heating mode. In table 200, steam heat cycling configuration is shown for a dual fan system. Without limitation, the plurality of heating stages may comprise a first stage, a second stage, a third stage, a fourth stage, and a fifth stage. The components of the system may include a bake element, a broil element, and a convection element. At certain stages, different components may be simultaneously activated or inactivated.

The first stage may comprise a preheating stage. In the first stage, the bake element may be on or active for 40 seconds, the broil element may be inactive or off, and the convection element may be on or active for 20 seconds. The first transition may begin at the 4 minutes and 30 seconds mark, and the second transition may begin if the temperature reached by the first transition is greater than or equal to a setpoint. Each of the components of the system may include a duty period before repeating. For example, the duty period may comprise 60 seconds. The duty period may be in relation to the on and off time for each component. By way of example, the convection element may be on at the 40 second mark, and off at the 60 second mark, thereby yielding a total on time of 20 seconds. In addition, each duty period or cycle during a postheat stage may be configured by the processor to repeat continuously (while active) to control the respective elements according to their predetermined timed cycles. Thus, the power output of the heating elements may be controlled via predetermined duty cycles by the processor.

The second stage may comprise a postheating stage. In the second stage, the bake element may be on or active for 30 seconds, the broil element may be on or active for 15 seconds, and the convection element may be on or active for 15 seconds. The third transition may begin if the temperature reached is greater than or equal to the setpoint.

The third stage may comprise a postheating stage. In the second stage, the bake element may be on or active for 60 seconds, the broil element may be on or active for 0 seconds, and the convection element may be on or active for 0 seconds. The fourth transition may begin if the time has reached 5 minutes.

The fourth stage may comprise a postheating stage. In the second stage, the bake element may be on or active for 15 seconds, the broil element may be on or active for 15 seconds, and the convection element may be on or active for 30 seconds. The fifth transition may begin if the time has reached 20 minutes.

The fifth stage may comprise a postheating stage. In the second stage, the bake element may be on or active for 20 seconds, the broil element may be on or active for 15 seconds, and the convection element may be on or active for 25 seconds. No transition is applicable here.

For each of the first to fifth stages of heating, the first convection fan and the second convection fan may have a duty cycle of 6 seconds. For example, the first convection fan and the second convection fan may have ten stages to yield the total of the same duty cycle as the 60 seconds for each of the components, as previously described, and controlled by the processor. In addition, variable fan speeds, from the respective first and second convection fans, may be utilized by the processor during both preheat and postheat stages. In some examples, the first convection fan and the second convection fan may be controlled by the processor to operate together at a single speed, such as a High H speed or Low L speed, every 6 seconds up to 60 seconds during any and all preheat and postheat stages. It is understood that the time when the first and second convection fans are on is not limited to such a duration, and that other time durations and cycle times may be used.

For the first stage of preheating, and regarding the first stage through seventh stage of the first convection fan, the first convection fan may be set at a high speed setting. For the eighth, ninth, and tenth stages, the first convection fan may be set at a low speed setting. For the first stage of preheating, and regarding the first stage through third stage of the second convection fan, the second convection fan may be set at a low speed setting. For the fourth through tenth stages, the convection fan may be set at a high speed setting.

For the second stage of postheating, and regarding the first through tenth stages of the first and second convection fans, the first convection fan may be set at a high speed setting and the second convection fan may be set at a low speed setting.

For the third stage of postheating, and regarding the first through tenth stages of the first and second convection fans, the first convection fan may be set at a high speed setting and the second convection fan may be set at a low speed setting.

For the fourth stage of postheating, and regarding the first through tenth stages of the first and second convection fans, the first convection fan may be set at a high speed setting and the second convection fan may be set at a low speed setting.

For the fifth stage of postheating, and regarding the first through tenth stages of the first and second convection fans, the first convection fan may be set at a high speed setting and the second convection fan may be set at a low speed setting.

Figure 3:
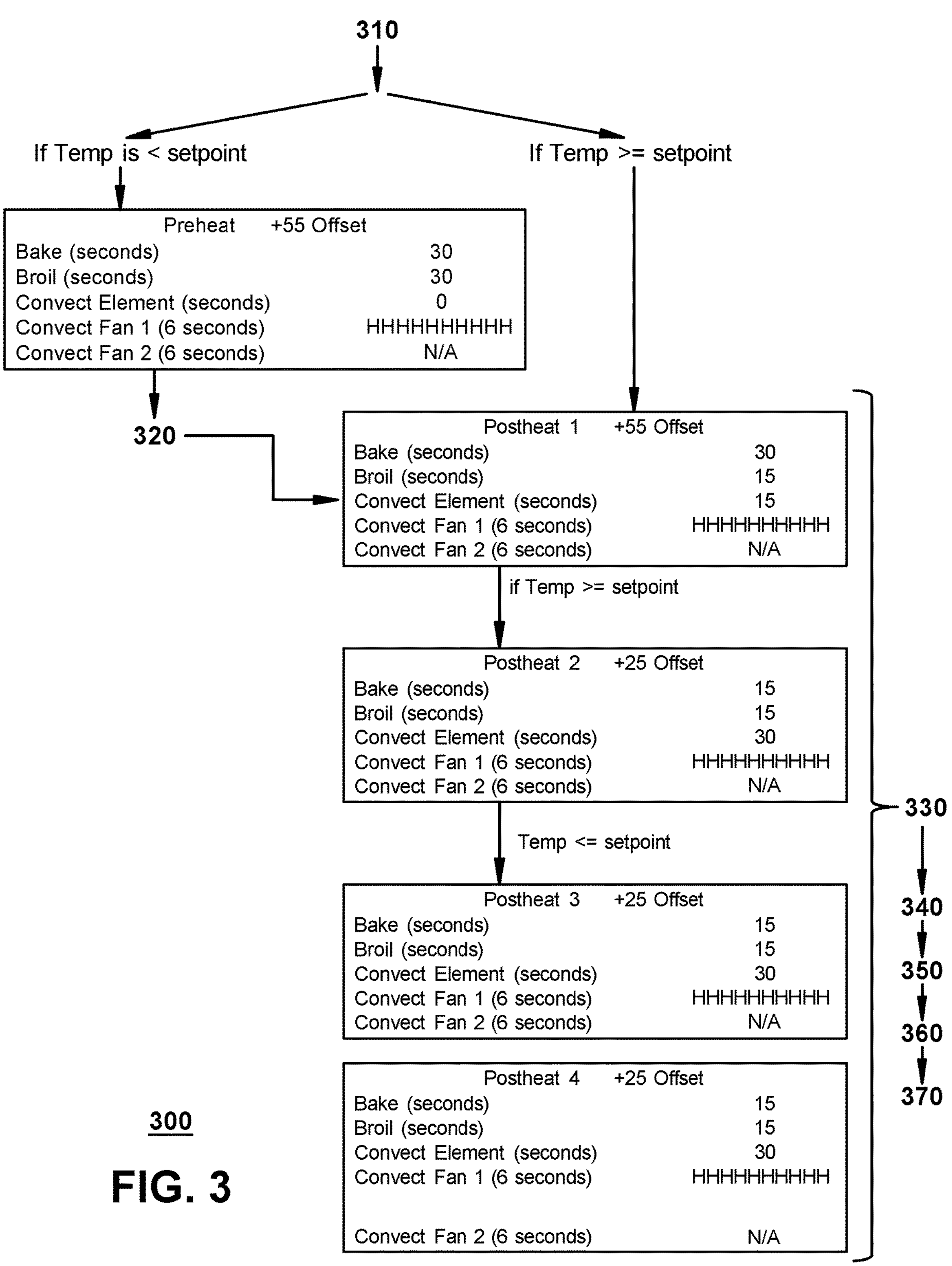
FIG. 3 illustrates operation of a steam heating system according to another example embodiment.

FIG. 3 illustrates operation of a steam heating system 300 according to an example embodiment. The steam heating system 300 comprises a processor, a memory, and the processor may be configured to control a single convection fan, a first element, a second element, and a third element. FIG. 3 may reference and incorporate any components of the steam heating system 100 of FIG. 1. The memory may be a read-only memory, write-once read-multiple memory or read/write memory, e.g., RAM, ROM, and EEPROM, and the steam heating system 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and reprogramed many times after leaving the factory. It may also be read many times.

The first element may include a convection element. The second element may include a broil element. The third element may include a bake element.

At 310, water may be added to the cavity bottom. In some examples, water should be added to a cold cavity, that is the cavity before it is heated, in order to eliminate early vaporization or damage to the oven bottom. The steam heating mode may be selected by activation of a button or via a touch panel screen so as to operate the oven accordingly. The processor may be configured to evaluate the temperature with reference to a setpoint. Based on the selection of the steam heating mode, at least one of a plurality of conditions may be triggered by the processor based on the existing temperature status of the oven. Under either condition, food is added to the oven at the indication of a preheat signal, and thereafter heated in the oven up to a safe reheating temperature and/or recommended time period without causing burning of the food and/or adversely impacting the texture of the food, in which the oven cycles through the one or more elements to achieve a setpoint. In some examples, the indication may comprise a visual indication, an audible indication, and/or any combination thereof.

Under a first condition, if the oven is cold due to non-use, a preheating process begins and the oven may be controlled by the processor such that it begins preheating up to a predetermined temperature and/or a predetermined time. Without limitation, the oven may begin preheating for 4 minutes and 30 seconds at 320. In this manner, if the processor evaluates that the temperature is lower than a setpoint, it may trigger preheating. In some examples, the first convection fan may be utilized during both preheat and postheat stages, and it may also be on at different fan speeds (such as High H or Low L) every 6 seconds up to 60 seconds. As indicated in the preheating stage, the bake element, broil element, and convection element are shown to be on for the given duration, and the single convection fan at a set speed (such as High H or Low L) every 6 seconds up to 60 seconds, as further described below with respect to FIG. 4.

Under a second condition, if the oven is already heated, the oven may be controlled by the processor such that it may be heated with the one or more components of the system deemed appropriate and in accordance with a cooking configuration to reach the next transition point. In this manner, if the processor evaluates that the temperature is greater than or equal to a setpoint, it may trigger postheating stages, as collectively shown at 330. As indicated in the postheating stages 330, the bake element, broil element, and convection element are shown to be on for the given duration, and the single convection fan at a set speed (such as High H or Low L) every 6 seconds up to 60 seconds, as further described below with respect to FIG. 4.

At 340, the door is opened at the conclusion of the final postheating stage. At 350, food contents are removed. At 360, the door is thereafter closed. At 370, the steam heating mode concludes by either resetting to its initial state or powering off.

FIG. 4 illustrates a table 400 for cycling components of a system according to an example embodiment. As depicted in table 400, numerous heating stages and components of the system are utilized to reheat the food item(s) through application of the selected steam heating mode. FIG. 4 may reference and incorporate any components of the steam heating system 300 of FIG. 3. In table 400, steam heat cycling configuration is shown for a single fan system. Without limitation, the plurality of heating stages may comprise a first stage, a second stage, a third stage, and a fourth stage. The components of the system may include a bake element, a broil element, and a convection element. At certain stages, different components may be simultaneously activated or inactivated.

The first stage may comprise a preheating stage. In the first stage, the bake element may be on or active for 30 seconds, the broil element may be on or active for 30 seconds, and the convection element may be on or active for 0 seconds. The first transition may begin at the 4 minutes and 30 seconds mark, and the second transition may begin if the temperature reached by the first transition is greater than or equal to a setpoint. Each of the components of the system may include a duty period before repeating. For example, the duty period may comprise 60 seconds. The duty period may be in relation to the on and off time for each component. By way of example, the broil element may be on at the 30 second mark, and off at the 60 second mark, thereby yielding a total on time of 30 seconds.

The second stage may comprise a postheating stage. In the second stage, the bake element may be on or active for 30 seconds, the broil element may be on or active for 15 seconds, and the convection element may be on or active for 15 seconds. The third transition may begin if the temperature reached is greater than or equal to the setpoint.

The third stage may comprise a postheating stage. In the second stage, the bake element may be on or active for 15 seconds, the broil element may be on or active for 15 seconds, and the convection element may be on or active for 30 seconds. The fourth transition may begin if the temperature is less than or equal to the setpoint.

The fourth stage may comprise a postheating stage. In the second stage, the bake element may be on or active for 15 seconds, the broil element may be on or active for 15 seconds, and the convection element may be on or active for 30 seconds.

For each of the first to fourth stages of heating, the single convection fan may have a duty cycle of 6 seconds. For example, the single convection fan may have ten stages to yield the total of the same duty cycle as the 60 seconds for each of the components, as previously described, and controlled by the processor. In addition, variable fan speeds, from the respective single convection fan, are utilized by the processor during both preheat and postheat stages. By way of example, the first convection fan may be set at a high speed setting. In another example, the first convection fan may be set at a low speed setting.

Figure 5:
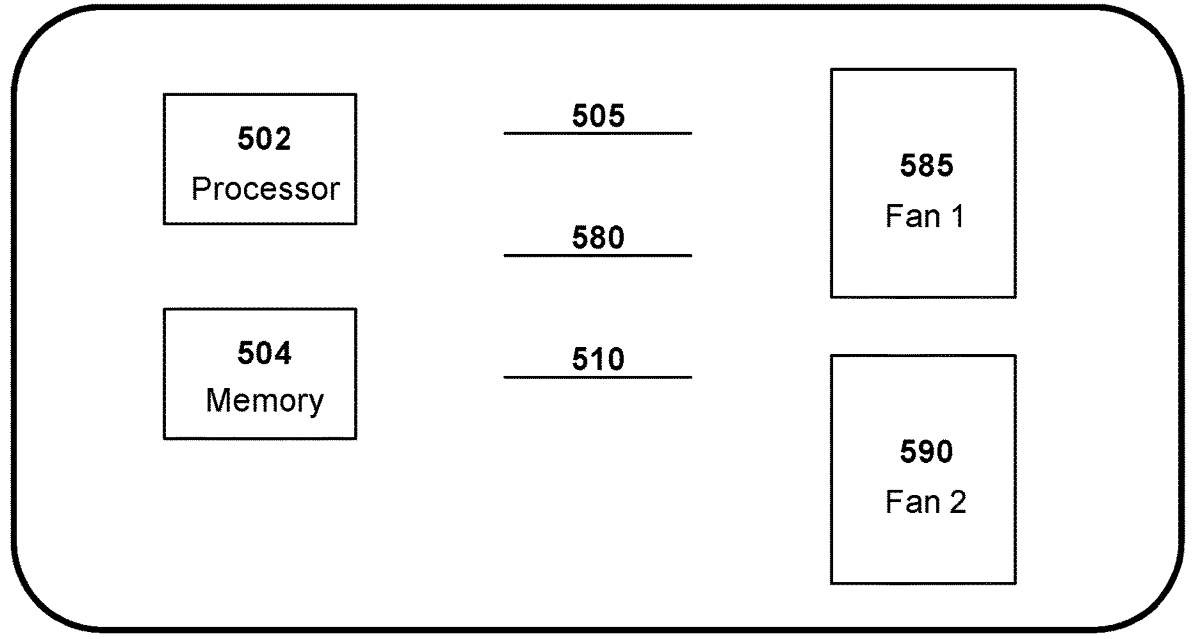
FIG. 5 depicts a block diagram of a cooking apparatus according to an example embodiment.

FIG. 5 illustrates a cooking apparatus 500 according to an example embodiment. The cooking apparatus 500 may include a processor 502, a memory 504, a plurality of heating elements 505, 580, 510, a first fan 585, and a second fan 590. Although FIG. 5 illustrates single instances of the components, apparatus 500 may include any number of components. The cooking apparatus 500 of FIG. 5 may reference and incorporate any components of table 400 of FIG. 4, the steam heating system 300 of FIG. 3, table 200 of FIG. 2, and system 100 of FIG. 1.

As previously explained, memory 504 may be coupled to processor 502. The processor 502 may be configured to operate, based on received input, a steam heating mode including selective control of any number of the plurality of heating elements 505, 580, 510, and the fans 585, 590. The first heating element 505 may include a convection element. The second heating element 580 may include a broil element. The third heating element 510 may include a bake element. For example, the first, second, and third heating elements 505, 580, 510 may be electrical resistance heating elements. The first heating element 505 may be disposed in a first portion of a cavity of an oven. The second heating element 580 may be disposed in an upper portion of the oven. The third heating element 510 may be disposed in a lower portion of the oven.

In one example, the processor 502 may be configured to control the bake heating element 510 and the two or more fans 585, 590. In another example, the processor 502 may be configured to control the bake heating element 510 and only one of the fans 585, 590.

The thermal energy from the specific cycling of one or more components of the cooking apparatus 500 within and between transitions from different stages generates the requisite steam for heating. More particularly, steam may be generated according to predetermined duty cycles in different stages, with only the temperature setpoint being input by the user.

The processor 502 may be configured to control steam heating in accordance with the systems and methods described herein. The processor 502 may be configured to control one or more components of the cooking apparatus 500 to implement the steam heating mode to, for example, reheat one or more foods. For example, the processor 502 may be configured to operate the bake element 510 of the cooking apparatus 500 to provide a majority of the heat during the initial postheat stage after notification for insertion of the food item to be reheated.

The processor 502 may be configured to control the first convection fan 585 and the second convection fan 590 for the entire duration of the steam heating. In some examples, the processor 502 may be configured to operate the first and second convection fans 585, 590 continuously for the entire duration of the steam heating and/or at different speeds from each other. In some examples, the processor 502 may be configured to operate the first and second convection fans 585, 590 at different speeds from each other. The first fan 585 may be independently controlled by the processor 502 from the second fan 590. The fans 585, 590 may be, for example, convection fans. The dual convection fans 585, 590 may be run simultaneously together in one or more heating stages and/or separately in one or more heating stages. In any number of stages, either fan 585, 590 may run at high or low speeds, switching between the speeds, and the dual fans 585, 590 may run at different speeds simultaneously or separately. Without limitation, and by way of example, the first convection fan 585 and the second convection fan 590 may be controlled by processor 502 and configured to operate together at a single speed, such as a High H speed or a Low L speed, for any given time duration. As previously mentioned, a dedicated steam heating mode may be optimized in a particular appliance to execute, by the processor, a steam heating algorithm that utilizes the heating elements 505, 580, 510 to condition the cooking cavity, in addition to the hidden-bake element used to vaporize water. Regarding the three heating elements 505, 580, 510, all may be run in a single stage, the broil element 580 may be full-time off during the preheat stage. In some examples, two elements may be configured by processor 502 to operate simultaneously in any preheat and/or postheat stage. The processor 502 may be configured to control active or inactive operational modes of any of the heating elements 505, 580, 510 during each predetermined duty cycle of the steam heating process. For example, the processor 502 may be configured to operate the bake heating element 510 during each predetermined duty cycle of the steam heating process.

The stages may target a predetermined temperature and an associated preheat and postheat offset, in which the offsets may be different from each other. In some examples, the stages may target a user-selected temperature, thereby instructing the processor 502, via selection of the steam heating mode, to operate the specific cycling of the one or more components of the cooking apparatus 500. In addition, all postheat duty cycles may be operated by the processor 502 according to hysteresis control using one or more predetermined temperature parameters. For example, the predetermined temperature parameter may comprise upper and lower temperatures, as explained above. Moreover, during each of the postheat stages, the duty cycle is operated via PID control between upper and lower bounds bracketing a desired 'setpoint' temperature so that the temperature profile oscillates between the bounds.

Figure 6:
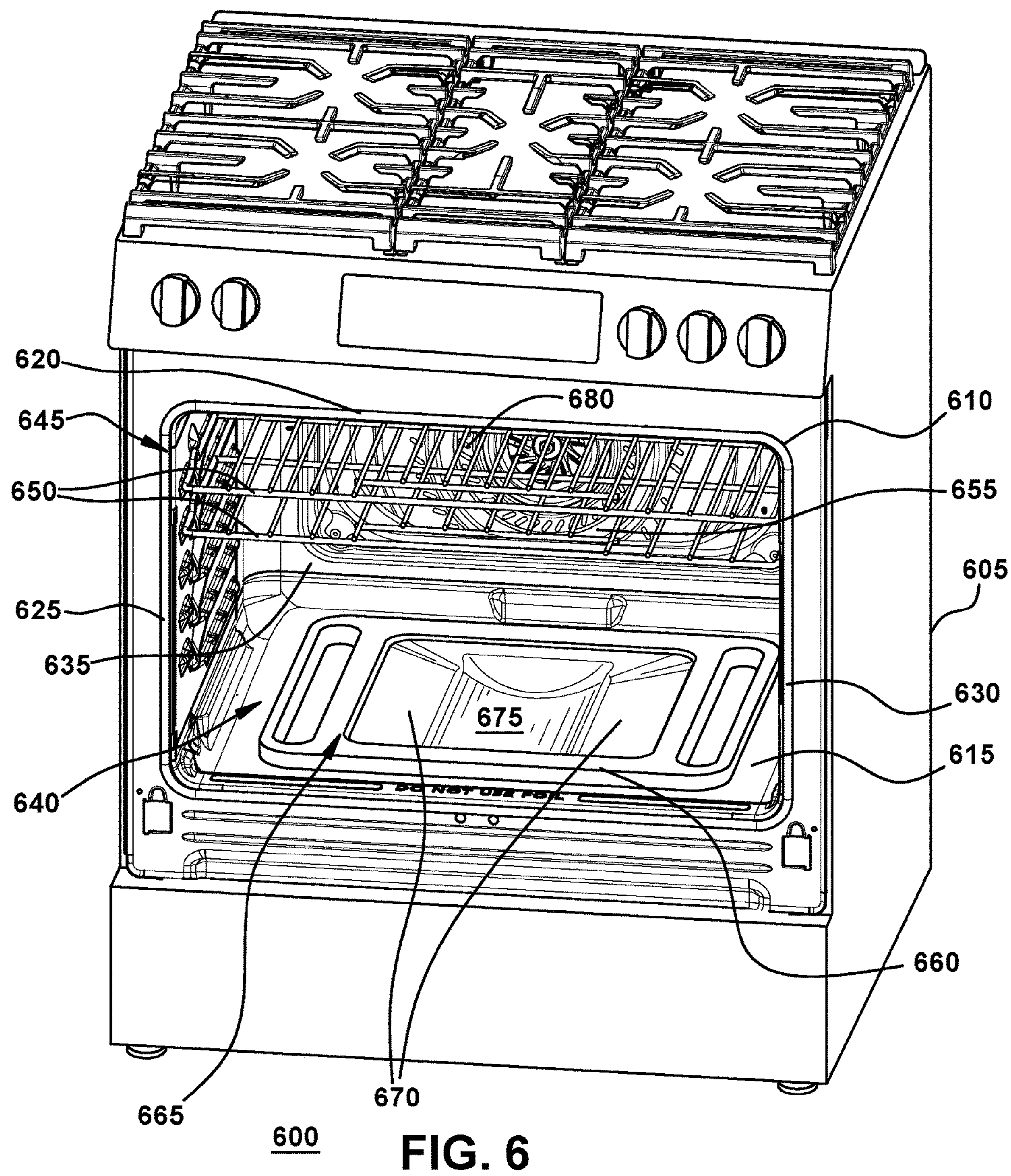
FIG. 6 depicts a cooking appliance according to an example embodiment.

FIG. 6 illustrates a cooking appliance 600 according to an example embodiment. Although FIG. 6 illustrates single instances of the components of the cooking appliance 600, cooking appliance 600 may include any number of components. The cooking appliance 600 may reference and incorporate any components explained above with respect to FIG. 5, FIG. 4, FIG. 3, FIG. 2, and FIG. 1. In addition, the cooking appliance 600 may include a processor, such as processor 502, and a memory, such as a memory 504, and configured to implement the steam heating systems and methods disclosed herein. The appliance 600 includes a housing 605 that supports a cooking chamber 610. The cooking chamber 610 has a bottom wall 615, a top wall 620, a pair of opposing side walls 625, 630, and a rear wall 635 that collectively define a cooking cavity 640. The cooking appliance 600 may further include a door (removed from FIG. 6 and thus not shown) that can provide selective access to the cooking cavity 640 through an opening 645 defined at the front of the cooking chamber 610. The cooking appliance 600 may further include one or more heating racks 650 that are disposed at predetermined intervals within the cooking cavity 640.

The cooking appliance 600 includes a convection heating system 655 for heating air within the cooking cavity 640 via convection. As further described below, and by way of example, the convection heating system 655 is also denoted as 700 in FIG. 7 and denoted as 800 in FIG. 8. Thus, convection heating system 655 may be interchangeably referred to as the convection heating system 700 or the convection heating system 800. The convection heating system 655 may be disposed, for example, in a region of the rear wall 635. As discussed further below, the convection heating system 655 can be controlled to perform a steam cooking operation. The convection heating system 655 can include one or more convection heating elements and one or more fans associated with the convection heating element(s) for guiding air across the convection heating element(s). For instance, in the present example the convection heating system 655 includes one convection heating element and a plurality of fans that are associated with the convection heating element for guiding air across the convection heating element. For example, referring briefly to FIG. 7 and FIG. 8, the convection heating element may be denoted as 805 in FIG. 8, and the plurality of fans may be denoted as 785 in FIG. 7, and denoted as 885 in FIG. 8. The fans 785 may comprise the fans 585, 590 as previously described with respect to FIG. 5, and fans 885 may comprise the fans 585, 590 as previously described with respect to FIG. 5. However, in other examples, the convection heating system 655 may have one convection heating element 805 associated with a single fan of 785, 885, multiple convection heating elements 805 associated with the same fan 785, 885, and/or multiple convection heating elements 805 that are each associated with one or more different fans 785, 885. The convection heating element 805 can be an electric-resistance element (e.g., coil) that generates heat via an electric current. For example, the first heating element 505 (as previously described above with respect to FIG. 5) may comprise the convection heating element 805. In some examples, the convection heating element 805 may be disposed in a region of the rear wall 635. For example, the fans 585, 590 (as previously described above with respect to FIG. 5) may comprise the plurality of fans 785, 885. While only a single fan is depicted in each of FIGS. 7 and 8, it is understood that each of these figures is not limited to only one fan and that each of fans 785, 885 do not only refer to a single fan, and that any number of fans may be used, including but not limited to two fans, such as fans 585 and fan 590, when referring to each of fans 785, 885. By way of example, fans 785 of FIG. 7 may include fan 585 and/or fan 590. Similarly, fans 885 of FIG. 8 may include fan 585 and/or fan 590. In some examples, the plurality of fans 785, 885 may be disposed in a region of the rear wall 635. Alternatively, the convection heating element 805 can be some other element (e.g., a gas burner assembly) that can be energized to produce heat for cooking that can be circulated within the cooking cavity air via convection. The fans 785, 885 may be located downstream from the convection heating element 805 to draw (i.e., suck) air past the convection heating element 805, or the fans 785, 885 may be located upstream from the convection heating element 805 to push (i.e., blow) air past the convection heating element 805. The fans 785, 885 can be configured to be operated together or separately at same or different speeds, e.g. a low speed and a high speed, as previously described above. Without limitation, and by way of example, the first convection fan 785 and the second convection fan 885 may be configured to operate together at a single speed, such as a High H speed or a Low L speed, for any given time duration. Multiple speed settings allow the convection system 655 to be operated in a variety of cooking operations that may benefit from different air flow rates. Additionally, the fans 785, 885 of the convection system 655 can be used to circulate air during other operations, such as a self-cleaning operation or an exhaust operation. Such operations also may benefit from speed settings that are different than those desired for cooking operations.

The cooking appliance 600 further includes a reservoir plate 660 for holding water in a reservoir 665 thereof that can be heated to generate steam for dispersal throughout the cooking cavity 640. The reservoir 665 is accessible from within the cooking cavity 640 and is preferably sized to hold a maximum of about 12 cups of water, though other volumes are possible. The reservoir 665 of the reservoir plate 660 includes inclined portions 670 leading to convergence at the deepest portion 675 of reservoir 665 thereof. This configuration results in water remaining in the deepest portion 675 of the reservoir 665 as the water is heated to steam. The deepest portion 675 is in the middle of the reservoir 665. In some examples, the reservoir 665 is disposed at a base of the cooking chamber 610 and, in particular, is formed at least partially from the base of the cooking chamber 610. For instance, in the illustrated embodiment the reservoir 665 is formed at the base of the cooking chamber 610 as a recess or well in the bottom wall 615 of the cooking chamber 610, which may be formed by metal bending, stamping, embossing, or other suitable techniques. Optionally, it can be fabricated via affixation of a plurality of distinct components, though this may be less preferred due to the potential for water leakage via affixation (e.g. weld) seams between adjacent components. The reservoir 665 effectively can be a sump of the cooking chamber 610 located at its base. However, the reservoir 665 may be disposed at other locations and/or may form other portions of the cooking chamber 610.

In some examples, the reservoir 665 may be an open reservoir provided at a base of the cooking chamber 610 such that the reservoir 665 is open to the cooking cavity 640 and the surface of the water in the reservoir 665 is exposed to the cooking cavity 640. Moreover, the cooking appliance 600 can include a shroud (for example, as can be seen in U.S. Patent Publication No. 2017/0343221, which is incorporated herein by reference) that can be arranged within the cooking cavity 640 to at least partially cover the reservoir 665 and the exposed surface of the water.

The cooking appliance 600 further includes a second heating element 680. In some examples, the second heating element 680 may comprise a broil element. The second heating element 680 may be disposed in a region of the top wall 620. For example, the second heating element 580 (as previously described above with respect to FIG. 5) may comprise the broil heating element 680. However, the second heating element 680 may include any number of heating elements in other examples.

Figure 9:
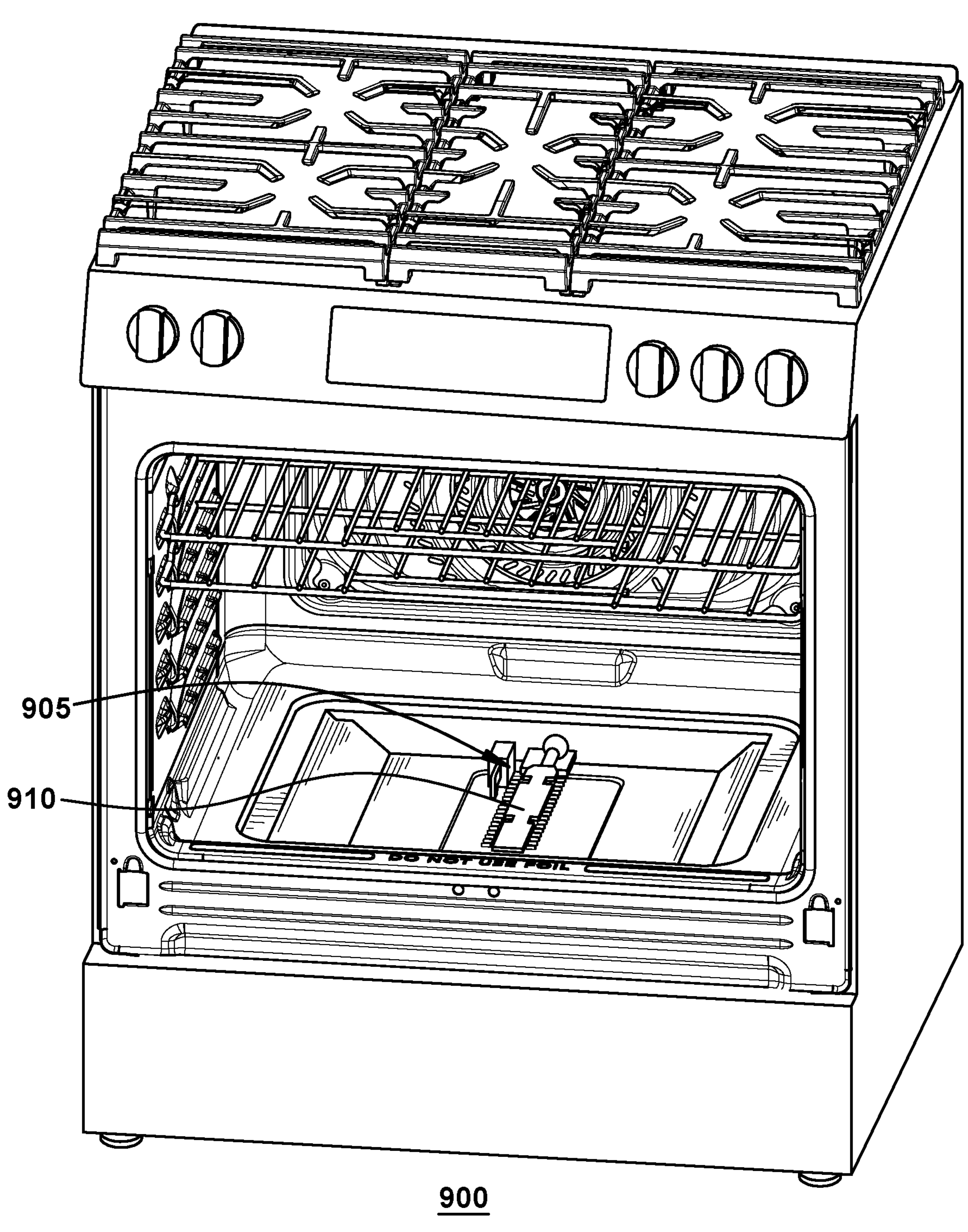
FIG. 9 depicts a cooking appliance with a water reservoir removed according to an example embodiment.

As further explained with respect to FIG. 9, the cooking appliance 600 further includes a third heating element.

Figure 7:
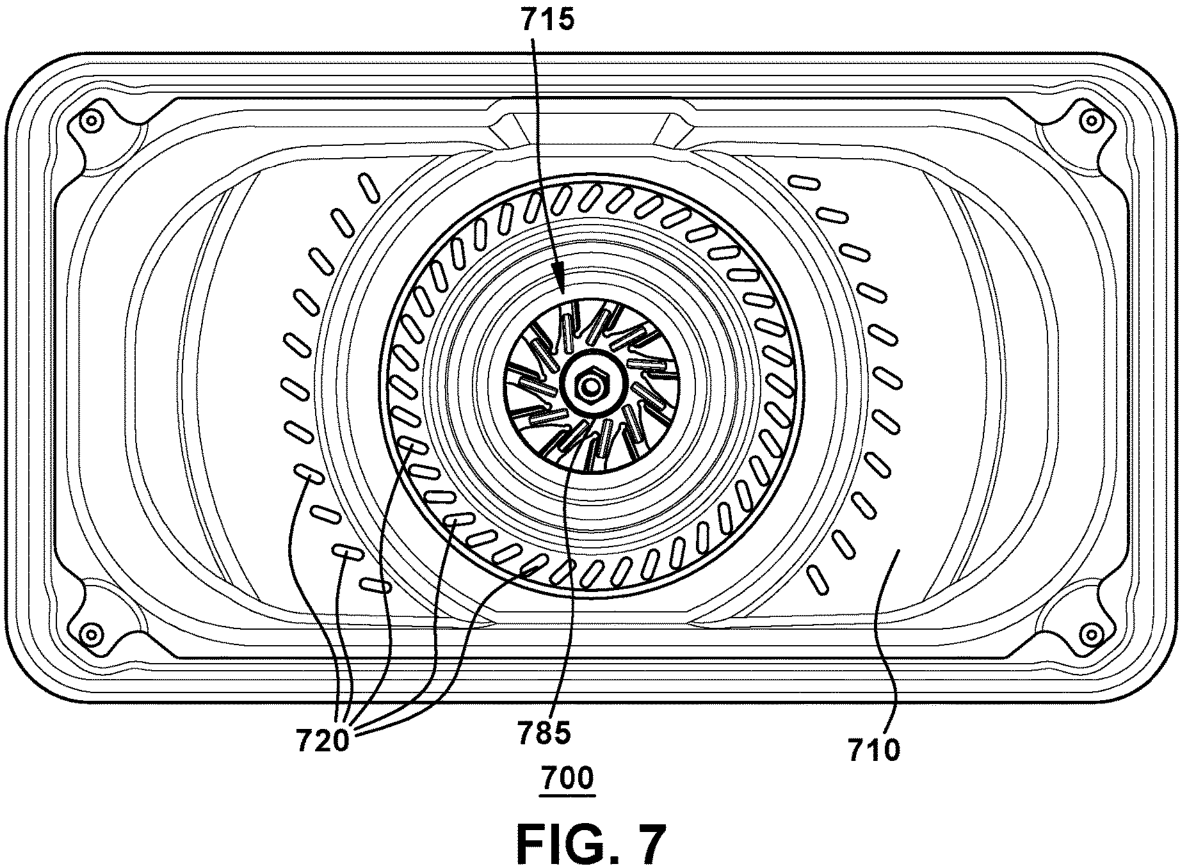
FIG. 7 depicts a convection heating system of a cooking appliance according to an example embodiment.

FIG. 7 illustrates a convection heating system 700 of a cooking appliance according to an example embodiment. Although FIG. 7 illustrates single instances of the components of the convection heating system 700, convection heating system 700 may include any number of components. The convection heating system 700 may reference and incorporate any components explained above with respect to FIG. 6, FIG. 5, FIG. 4, FIG. 3, FIG. 2, and FIG. 1. As further explained below, FIGS. 6, 7, and 8 may be collectively interpreted together regarding the convection heating system 655, 700, 800, and will be referenced as such.

The convection heating system 700 may be located within the cooking cavity 640 or it may be located outside of the cooking chamber 610 and fluidly coupled with the cooking cavity 640 via one or more air passageways. In some examples, the cooking chamber 610 may form part of the convection heating system 700. In the present example, the convection heating system 700 has a mounting area, such as mounting area 815, attached to the rear wall 28 of the cooking chamber 610. The convection heating element 805 and fans 785, 885 are attached to the mounting area 815. The convection heating system 700 further includes a cover 710 that is attached to the mounting area 815 to define a partially enclosed space in which the convection heating element 805 and fans 785, 885 are housed. As the fans 785, 885 are operated, air is drawn from the cooking cavity 640 into the space where the fans 785, 885 are housed via one or more inlets 715 in the cover 710. The air is then guided past the convection heating element 805 and blown through one or more outlets 720 in the cover 710 back into the greater cooking cavity 640 outside of the convection cover 48. In the illustrated embodiment, the cover 710 includes a single inlet 715 for guiding air radially to the center of the fans 785, 885 and a plurality of outlets 720 for directing air expelled by the fans 785, 885 throughout the cooking cavity 640. The outlets 720 can be oriented at numerous angles in order to promote uniform air circulation or turbulence circulate heated air throughout the entire cooking cavity 640 in order to achieve a substantially uniform temperature profile therein that minimizes hot spots. In other embodiments, the convection heating system 700 may have a variety of configurations of inlet(s) 715 and outlet(s) 720 for guiding air into and out from the space underneath the convection cover where it can be heated by the convection heating element 805 before being expelled by the fans 785, 885.

Figure 8:
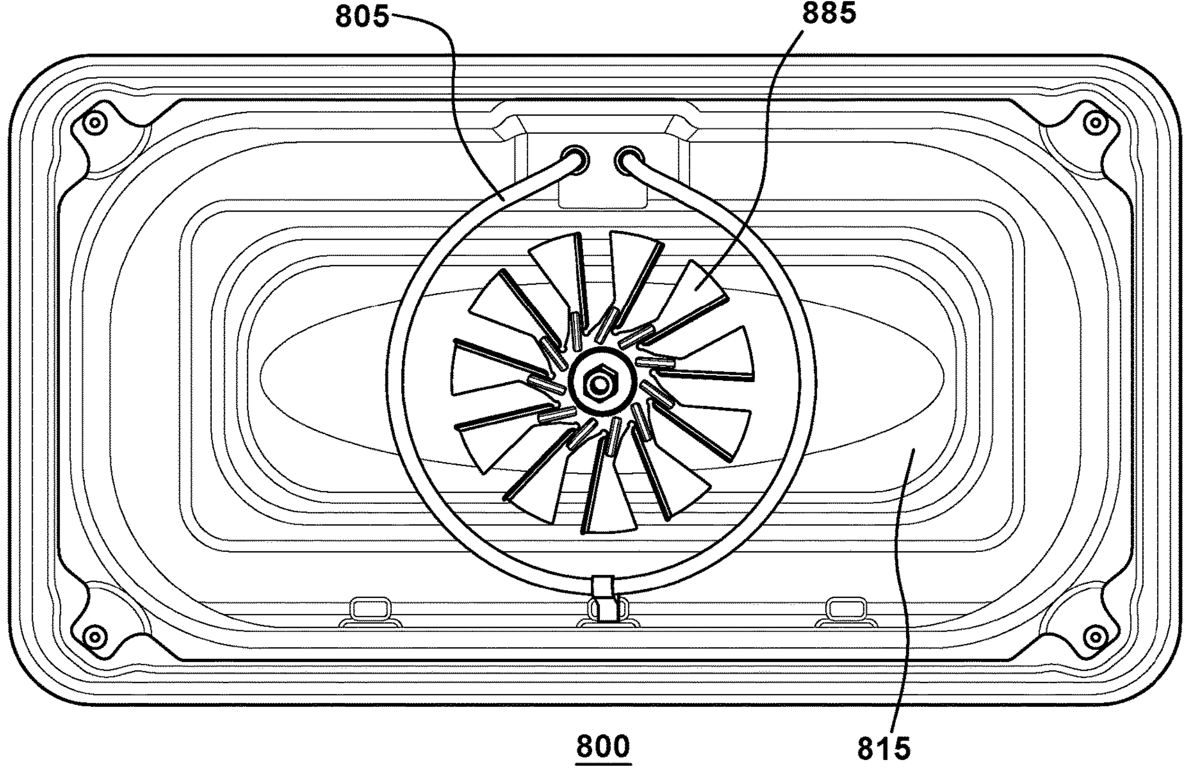
FIG. 8 depicts a convection heating system of a cooking appliance with a convection cover thereof removed according to an example embodiment.

FIG. 8 illustrates a convection heating system 800 of a cooking appliance with a convection cover thereof removed according to an example embodiment. FIG. 8 may reference same or similar components of the convection heating system 800. In particular, FIG. 8 depicts the convection heating system 700 of FIG. 7 including the convection heating element 805, fans 785, 885, mounting area 815, and without the cover 710. Although FIG. 8 illustrates single instances of the components of the convection heating system 800, convection heating system 800 may include any number of components. The convection heating system 800 may reference and incorporate any components explained above with respect to FIG. 7, FIG. 6, FIG. 5, FIG. 4, FIG. 3, FIG. 2, and FIG. 1.

FIG. 9 illustrates a cooking appliance 900 with the water reservoir 665 removed according to an example embodiment. Although FIG. 9 illustrates single instances of the components of the cooking appliance 900, cooking appliance 900 may include any number of components. The cooking appliance 900 may reference and incorporate any components explained above with respect to FIG. 8, FIG. 7, FIG. 6, FIG. 5, FIG. 4, FIG. 3, FIG. 2, and FIG. 1. For example, as previously explained above, cooking appliance 900 may refer to the cooking appliance 600 of FIG. 6, and will be referenced as such.

The cooking appliance 900 further includes a baking system 905 that can be controlled to perform a baking operation. The baking system 905 can include one or more heating elements 910 that are located exterior of the cooking cavity 640 below the bottom wall 615 of the cooking chamber 610. For example, the third heating element 510 (as previously described above with respect to FIG. 5) may comprise the bake heating element 910. However, the baking system 905 may include any number of heating elements in other examples. The heating element 910 of the baking system 905 are configured to be energized to provide heat for the cooking chamber 610 during the baking operation. The heating element 910 may comprise a gas-burning heating element, or burner. In operation, gas is delivered to the burner 910 which is ignited in order to provide thermal energy to the cooking cavity 640, e.g. as part of a baking operation.

Where the heating element 910 is a gas burner, industry regulations may require that the convection heating element 805 of the convection heating system 655 have a relatively low power to prevent accidental ignition of gas being supplied to the oven. For example, the convection heating element 805 can have a power of 500 W to 1500 W, preferably 650 W to 1350, and most preferably 800 W to 1200 W, e.g. 1000 W. Additionally, based on the position of the heating element(s) 910 of the baking system 905, it can also be controlled as part of a steam cooking operation. Specifically, the position of the heating element(s) 910 below the reservoir 665 can allow it/them to be energized in order to heat water stored in the reservoir 665 to steam. Water in the reservoir 665 can be heated by thermal energy emitted by the energized heating element 910, thereby raising the temperature thereof. A portion of this thermal energy is thereafter passed to the air within the cooking cavity 640 from the water, thereby raising the temperature of the air. As the heating element 910 continues to be energized, the temperature of both the water in the reservoir 665 and the air within the cooking cavity 640 is raised, as the water temperature approaches its boiling point. When the boiling point is reached, steam is produced and rises into and mixes with the air in the cooking cavity 640.

Figure 10:
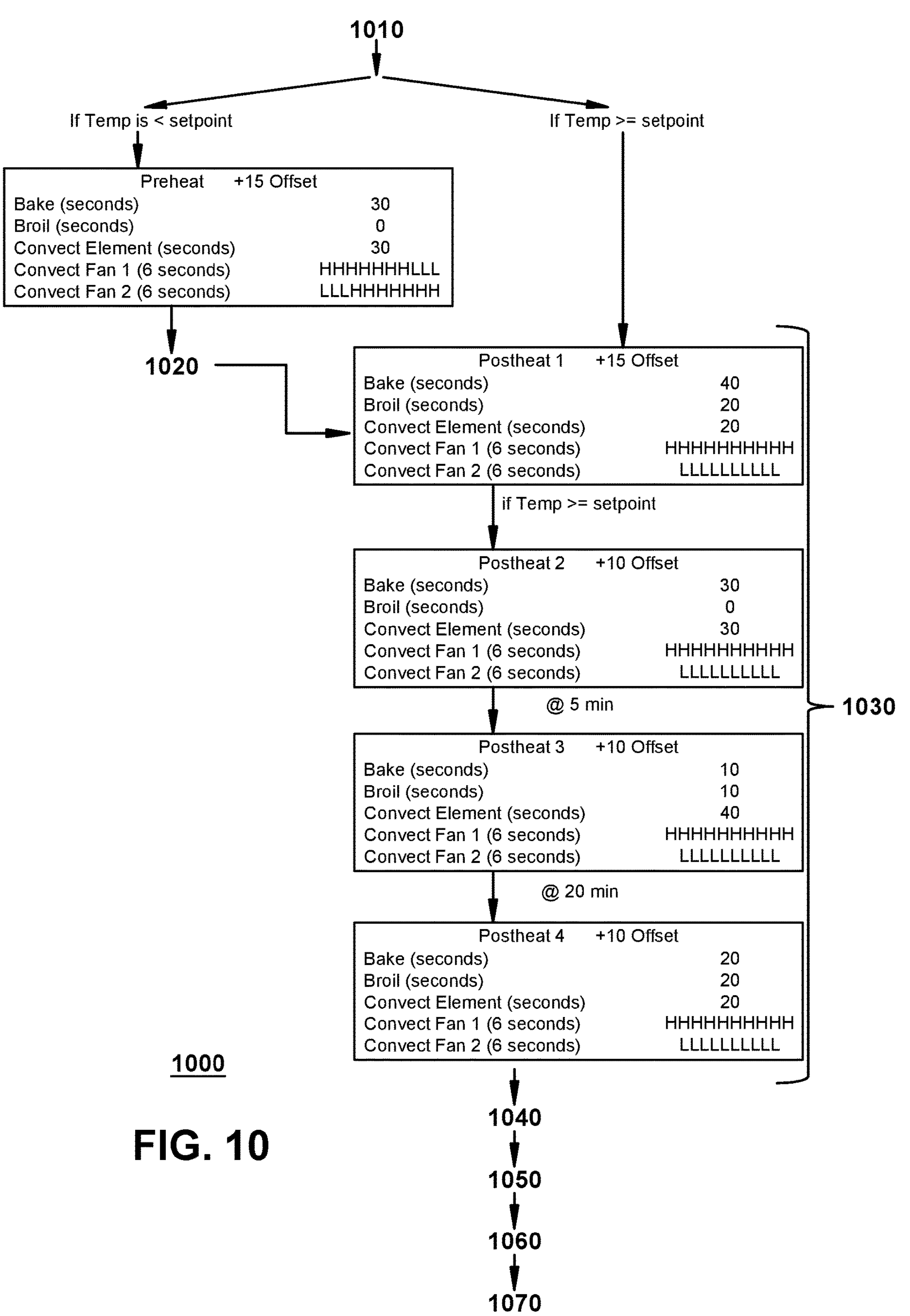
FIG. 10 illustrates operation of a steam heating system according to another example embodiment.

FIG. 10 illustrates operation of a cooking apparatus, such as a steam heating system 1000, according to an example embodiment Although FIG. 10 refers to the steam heating system 100 of FIG. 1, it is understood that FIG. 10 may reference and incorporate any components of any components explained above with respect to FIG. 9, FIG. 8, FIG. 7, FIG. 6, FIG. 5, FIG. 4, FIG. 3, and FIG. 2. The steam heating system 1000 comprises a processor, a memory, and the processor may be configured to control a first convection fan, a second convection fan, a first element, a second element, and a third element. In some examples, the first element, the second element, and the third element may each include a heating element, as further described below. The memory may be a read-only memory, write-once read-multiple memory or read/write memory, e.g., RAM, ROM, and EEPROM, and the steam heating system 1000 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The first element may include a convection element. The second element may include a broil element. The third element may include a bake element. The first, second, and third heating elements may be, for example, electrical resistance heating elements. The first convection fan may be independently controlled from the second convection fan. The dual convection fans may be run simultaneously together in one or more heating stages and/or separately in one or more heating stages. In any number of the stages, either fan may run at H or L speeds, switching between the speeds, and the dual fans may run at different speeds simultaneously or separately. Without limitation, and by way of example, the first convection fan and the second convection fan may be configured to operate together at a single speed, such as a High H speed or a Low L speed, for any given time duration. A dedicated steam heating mode may be optimized in a particular appliance to execute, by the processor, the steam heating algorithm that utilizes one or more of the broil and convection elements to condition the cooking cavity, in addition to the hidden-bake element used to vaporize water. Regarding the three heating elements, all three may be run in a single stage, and the broil element may be full-time off during preheat. In some examples, two elements may be configured by the processor to operate simultaneously in any preheat and/or postheat stage.

Preheating may be broken into a stage wherein the hidden-bake element, responsible for driving evaporation of steam, is operative at least half of the respective duty cycle, with other elements operative the remainder of the respective duty cycle. Whereas, during the postheat stages, initially the hidden-bake element is operative full-time (full duty cycle), and then is reduced to less on-time during subsequent postheat stages. Notably, in none of the stages is the bake element inoperative during the full stage. The preheat stages share a common first (preheat) offset, which is a variation that may include a first predetermined temperature range including a first value and a second value or a first predetermined percentage range, such as a first percentage value and a second percentage value, whereas the postheat stages share a common second (postheat) offset, which is a variation that may include a second predetermined temperature range including a third value and a fourth value or a second predetermined percentage range, such as a third percentage value and a fourth percentage value, wherein the stage actually targets a target temperature equal to the user selected setpoint plus the associated stage offset. While the first predetermined temperature range may differ from the second predetermined temperature range, the first predetermined percentage range may be the same or different from the second predetermined percentage range. Moreover, during the postheat stages the target temperature (including offset) is targeted via a PID algorithm that oscillates between upper- and lower-bound temperatures around the target temperature, for example plus (+) 10 degrees and minus (−) 5 degrees, in effect emulating hysteresis control about the target temperature.

A cooking oven is provided with a sump at its base to hold water. A hidden-bake element disposed beneath the bottom wall of the sump, such as the bottom wall of the cooking cavity, then is used to deliver thermal energy to the water therein, to vaporize it to steam. More particularly, the hidden-bake element is operative for a given time period during preheating stage, where it is effective to heat water in the sump to generate steam. The steam may then be circulated in the oven cavity, via natural and/or forced convection, as a medium to deliver thermal energy to pre-cooked foods to reheat them by operation of the selected steam heating mode. The broil element may be disposed at an upper portion of the cooking cavity, and the convection system (convection element and fan) may be disposed at the center of a rear wall.

At 1010, water may be added to the cavity bottom. In some examples, water should be added to a cold cavity, that is the cavity before it is heated, in order to eliminate early vaporization or damage to the oven bottom. The steam heating mode may be selected by activation of a button or via a touch panel screen so as to operate the oven accordingly. For example, the algorithm may be optimized by the processor for different food products having different heat absorption characteristics. This algorithm, or group of algorithms, may be called up for implementation by the processor via input comprising: (i) a user-selected, dedicated steam heating mode, (ii) a dedicated control input such as a touch button, or (iii) a menu system on a dynamic touchscreen input device. The processor may be configured to evaluate the temperature with reference to a setpoint. Based on the selection of the steam heating mode, at least one of a plurality of conditions may be triggered by the processor based on the existing temperature status of the oven.

Under either condition, food is added to the oven at the indication of a preheat signal, and thereafter heated in the oven up to a safe reheating temperature and/or recommended time period without causing burning of the food and/or adversely impacting the texture of the food, in which the oven cycles through the one or more elements to achieve a setpoint. In some examples, the indication may comprise a visual indication, an audible indication, and/or any combination thereof. Moreover, the only user input into the steam heating mode is the desired final temperature. Once that mode is selected to reflect the desired final temperature, steam is generated according to predetermined parameters that are fixed and not user-selectable. Thus, a user is not permitted to input a desired level of steam.

Under a first condition, if the oven is cold due to non-use, a preheating process begins and the oven may be controlled by the processor such that it begins preheating up to a predetermined temperature and/or a predetermined time. For example, as depicted at 1020 of FIG. 10, the oven may begin preheating for 4 minutes and 30 seconds. In this manner, if the processor evaluates that the temperature is lower than a setpoint, it may trigger preheating. As indicated in the preheating stage, the bake element, broil element, and convection element are shown to be on for the given duration, and the first and second convection fans are shown to be on at different fan speeds (such as High H or Low L) every 6 seconds up to 60 seconds, as further described below with respect to FIG. 11. In some examples, the first convection fan and the second convection fan may be configured to operate together at a single speed, such as a High H speed or Low L speed. It is understood that the time when the first and second convection fans are on is not limited to such a duration, and that other time durations and cycle times may be used. Thus, the preheat stage will transition directly to the postheat stage once the commonly defined preheat temperature has been reached. In addition, during the preheat stage, all heaters in the oven may be energized by the processor to achieve a desired temperature. Further, the processor may be configured to maintain a desired temperature for a predetermined time by energizing and/or de-energizing a heater.

Under a second condition, if the oven is already heated, the oven may be controlled by the processor such that it may be heated with the one or more components of the system deemed appropriate and in accordance with a cooking configuration to reach the next transition point. In this manner, if the processor evaluates that the temperature is greater than or equal to a setpoint, it may trigger postheating stages, as collectively shown at 1030. As indicated in the postheating stages 1030, the bake element, broil element, and convection element are shown to be on for the given duration, and the first and second convection fans are shown to be on at different fan speeds (such as High H or Low L) every 6 seconds up to 60 seconds, as further described below with respect to FIG. 11. In some examples, the first convection fan and the second convection fan may be configured to operate together at a single speed, such as a High H speed or Low L speed, every 6 seconds up to 60 seconds. It is understood that the time when the first and second convection fans are on is not limited to such a duration, and that other time durations and cycle times may be used.

At 1040, the door is opened at the conclusion of the fourth postheating stage. At 1050, food contents are removed. At 1060, the door is thereafter closed. At 1070, the steam heating mode concludes by either resetting to its initial state or powering off.

As will be further described below, the thermal energy from the specific cycling of one or more components of the system within and between transitions from different stages generates the requisite steam for heating. More particularly, steam is generated according to predetermined duty cycles in different stages, with only the temperature setpoint being input by the user.

The processor may be configured to control steam heating in accordance with the systems and methods described herein. The processor may be configured to control one or more components of the system to implement the steam heating mode to, for example, reheat one or more foods. The processor may be configured to control a bake heating element of the system. For example, the processor may be configured to operate the bake heating element to provide a majority of heat output during one or more preheat stages and/or one or more postheat stages.

The processor may be configured to control a bake element of the system. For example, the processor may be configured to operate a bake element of the system to provide all of the heat during an initial postheat stage after notification for insertion of the food item to be reheated. In another example, the processor may be configured to operate the bake element of the system to provide a majority of the heat during the initial postheat stage after notification for insertion of the food item to be reheated.

The processor may be configured to control the first convection fan and the second convection fan for the entire duration of the steam heating. In some examples, the processor may be configured to operate the first and second convection fans continuously for the entire duration of the steam heating and/or at different speeds from each other. For example, the processor may be configured to operate the first convection fan and the second convection fan together at a single speed, such as a High H speed or Low L speed, every 6 seconds up to 60 seconds. It is understood that the time when the first and second convection fans are on is not limited to such a duration, and that other time durations and cycle times may be used. The processor may be configured to operate the bake heating element during each predetermined duty cycle of the steam heating process.

The stages may target a predetermined temperature and an associated preheat and postheat offset, in which the offsets may be different from each other. In some examples, the stages may target a user-selected temperature, thereby instructing the processor via selection of the steam heating mode to operate the specific cycling of the one or more components of the system. In addition, all postheat duty cycles may be operated by the processor according to hysteresis control using one or more predetermined temperature parameters. For example, the predetermined temperature parameter may comprise upper and lower temperatures, as explained above. Moreover, during each of the postheat stages, the duty cycle is operated via PID control between upper and lower bounds bracketing a desired 'setpoint' temperature so that the temperature profile oscillates between the bounds.

FIG. 11 illustrates a table 1100 for cycling components of a steam heating system according to an example embodiment. Although FIG. 11 refers to the steam heating system 100 of FIG. 10, it is understood that FIG. 11 may reference and incorporate any components of any components explained above with respect to FIG. 9, FIG. 8, FIG. 7, FIG. 6, FIG. 5, FIG. 4, FIG. 3, FIG. 2, and FIG. 1. As depicted in table 1100, numerous heating stages and components of the system are utilized to reheat the food item(s) through application of the selected steam heating mode. In table 1100, steam heat cycling configuration is shown for a dual fan system. Without limitation, the plurality of heating stages may comprise a first stage, a second stage, a third stage, a fourth stage, and a fifth stage. The components of the system may include a bake element, a broil element, and a convection element. At certain stages, different components may be simultaneously activated or inactivated. As further illustrated in FIG. 11, two elements may be on at the same time for any number of heating stages, including but not limited to the bake element and the convection element, the broil element and the convection element, and the bake element and the broil element. It is understood that the cycling configuration of the elements for each of the heating stages depicted in FIG. 11 are not limited to these times and/or sequences for the given heating stage, and that any given time duration and/or sequence for two heating elements may be used for any number of heating stages. Further, in some examples, it is not required that the two heating elements are on at the same time for the same duration for a given heating stage, and rather that the two heating elements may be on at the same time for a different duration for any heating stage. In other words, one of the two heating elements may deactivate quicker than the remaining one of the two heating elements despite being activated at the same time.

The first stage may comprise a preheating stage. In the first stage, the bake element may be on or active for 300 seconds, the broil element may be inactive or off, and the convection element may be on or active for 300 seconds. Thus, two heating elements, namely the bake element and the convection element, may be on at the same time for the same duration. The first transition may begin at the 4 minutes and 30 seconds mark, and the second transition may begin if the temperature reached by the first transition is greater than or equal to a setpoint. Each of the components of the system may include a duty period before repeating. For example, the duty period may comprise 60 seconds. The duty period may be in relation to the on and off time for each component. By way of example, the convection element may be on at the 0 second mark, and off at the 30 second mark, thereby yielding a total on time of 30 seconds. In addition, each duty period or cycle during a postheat stage may be configured by the processor to repeat continuously (while active) to control the respective elements according to their predetermined timed cycles. Thus, the power output of the heating elements may be controlled via predetermined duty cycles by the processor.

The second stage may comprise a postheating stage. In the second stage, the bake element may be on or active for 40 seconds, the broil element may be on or active for 20 seconds, and the convection element may be on or active for 20 seconds. Thus, two heating elements, namely the broil element and the convection element, may be on at the same time for the same duration. The third transition may begin if the temperature reached is greater than or equal to the setpoint.

The third stage may comprise a postheating stage. In the second stage, the bake element may be on or active for 30 seconds, the broil element may be on or active for 0 seconds, and the convection element may be on or active for 30 seconds. Thus, two heating elements, namely the bake element and the convection element, may be on at the same time for the same duration. The fourth transition may begin if the time has reached 5 minutes.

The fourth stage may comprise a postheating stage. In the second stage, the bake element may be on or active for 10 seconds, the broil element may be on or active for 10 seconds, and the convection element may be on or active for 40 seconds. Thus, two heating elements, namely the bake element and the broil element, may be on at the same time for the same duration. The fifth transition may begin if the time has reached 20 minutes.

The fifth stage may comprise a postheating stage. In the second stage, the bake element may be on or active for 20 seconds, the broil element may be on or active for 20 seconds, and the convection element may be on or active for 20 seconds. Thus, two heating elements, namely the bake element and the convection element, may be on at the same time for the same duration. No transition is applicable here.

For each of the first to fifth stages of heating, the first convection fan and the second convection fan may have a duty cycle of 6 seconds. For example, the first convection fan and the second convection fan may have ten stages to yield the total of the same duty cycle as the 60 seconds for each of the components, as previously described, and controlled by the processor. In addition, variable fan speeds, from the respective first and second convection fans, may be utilized by the processor during both preheat and postheat stages. In some examples, the first convection fan and the second convection fan may be controlled by the processor to operate together at a single speed, such as a High H speed or Low L speed, every 6 seconds up to 60 seconds during any and all preheat and postheat stages. It is understood that the time when the first and second convection fans are on is not limited to such a duration, and that other time durations and cycle times may be used.

For the first stage of preheating, and regarding the first stage through seventh stage of the first convection fan, the first convection fan may be set at a high speed setting. For the eighth, ninth, and tenth stages, the first convection fan may be set at a low speed setting. For the first stage of preheating, and regarding the first stage through third stage of the second convection fan, the second convection fan may be set at a low speed setting. For the fourth through tenth stages, the convection fan may be set at a high speed setting.

For the second stage of postheating, and regarding the first through tenth stages of the first and second convection fans, the first convection fan may be set at a high speed setting and the second convection fan may be set at a low speed setting.

For the third stage of postheating, and regarding the first through tenth stages of the first and second convection fans, the first convection fan may be set at a high speed setting and the second convection fan may be set at a low speed setting.

For the fourth stage of postheating, and regarding the first through tenth stages of the first and second convection fans, the first convection fan may be set at a high speed setting and the second convection fan may be set at a low speed setting.

For the fifth stage of postheating, and regarding the first through tenth stages of the first and second convection fans, the first convection fan may be set at a high speed setting and the second convection fan may be set at a low speed setting.

The term "energized" as used herein when describing a heating system, or more specifically a heating element of the heating system, refers to a state in which chemical or electrical energy (e.g., in the form of combustible fuel, current, etc.) is actively being supplied to the heating element and is converted therein to thermal energy for heating food. The term "energized" does not refer to a state in which the heating element may be dissipating or radiating heat from residual thermal energy stored therein but is not being actively supplied with energy. For example, a resistance heating element may continue to dissipate or radiate heat from residual thermal energy therein even after it is no longer being energized and thus is not being supplied with electrical current.

It is also to be noted that the term "energized" as used herein in relation to any number of fans similarly means that energy is being actively supplied to the fan(s) to drive its operation to generate air flow. The term "energized" does not refer to a state in which the fan(s), no longer supplied with energy, nevertheless continues to generate flow based on residual energy (e.g. stored in a rotating impeller) that continues to motivate air flow until that stored energy has been dissipated.

When the term "energized" is used herein in relation to heating element(s) or fan(s) during a particular stage or phase of a heating operation, it is to be understood that the heating element(s) may be energized for all or part of the time during of the stage or phase. More specifically, the heating element(s) or fan(s) can be energized according to one or more specific duty cycles during the particular stage or phase, where the heating element(s) or fan(s) is activated (energized) for a certain period of time and off for a certain period of time in a cyclical fashion. For example, the one of the heating elements can be energized for 30 seconds and then not energized for 30 seconds cyclically during a particular stage or phase. Alternatively, one of the heating elements can be energized throughout the particular stage or phase. The heating elements and fan(s) are energized according to a timed duty cycle (usually 60 seconds) wherein they are energized and de-energized, respectively, during different portions of each cycle as known in the art. Multiple such elements/fans can be energized simultaneously, alternatively, or in an overlapping fashion during the cycle, depending on the requirements of the associated algorithm that executes the particular stage or phase.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cooking apparatus, comprising:
- a cooking chamber defining a cooking cavity for receiving one or more food items;
- a bake heating element;
- at least one fan; and
- a processor configured to operate, based on received input, a steam heating mode including a plurality of steam heating stages,
- wherein each stage of the plurality of steam heating stages is configured to selectively control the bake heating element and the at least one fan according to a respective preset and timed duty cycle in order to generate steam and target a respective setpoint temperature that is equal to a user selected temperature plus a stage-specific offset, and
- wherein one or more stages of the plurality of steam heating stages is configured to operate the bake heating element such that the bake heating element provides a majority of heat output for the one or more stages.

2. The cooking apparatus of claim 1, wherein the plurality of steam heating stages comprises one or more preheating stages and one or more postheating stages.

3. The cooking apparatus of claim 1, wherein the plurality of steam heating stages comprises a first steam heating stage and a second steam heating stage, wherein the first steam heating stage transitions to the second steam heating stage based on time lapse of the first steam heating stage.

4. The cooking apparatus of claim 1, wherein the plurality of steam heating stages comprises a first postheat stage selected from the plurality of steam heating stages after notification of insertion of the one or more food items in the cooking cavity, wherein the first postheat stage is configured to operate the bake heating element such that the bake heating element provides a majority of heat output for the first postheat stage.

5. The cooking apparatus of claim 1, wherein:
- the plurality of steam heating stages comprises a preheating stage and a postheating stage, and
- the stage-specific offset of the preheating stage is different from stage-specific offset of the postheating stage.

6. The cooking apparatus of claim 1, wherein the at least one fan includes a first convection fan that operates continuously at a first speed during at least one stage of the plurality of steam heating stages.

7. The cooking apparatus of claim 6, wherein the at least one fan further includes a second convection fan that operates continuously at a second speed during the at least one stage.

8. The cooking apparatus of claim 1, wherein the plurality of steam heating stages comprises a preheat stage and a postheat stage, wherein the at least one fan includes a first convection fan that operates at a first variable speed during the preheat stage and postheat stage.

9. The cooking apparatus of claim 8, wherein the at least one fan further includes a second convection fan that operates at a second variable speed during the preheat stage and postheat stage.

10. The cooking apparatus of claim 1, wherein the plurality of steam heating stages comprises a postheat stage, and the processor is configured to operate the respective preset and timed duty cycle of the postheat stage according to hysteresis control using one or more predetermined temperature parameters.

11. A method of operating a cooking apparatus comprising a cooking chamber defining a cooking cavity for receiving one or more food items, a bake heating element, at least one fan, and a processor, the method comprising:

operating, by the processor, a steam heating mode including a plurality of steam heating stages, wherein each stage of the plurality of steam heating stages selectively controls the bake heating element and the at least one fan according to a respective preset and timed duty cycle to generate steam and target a respective setpoint temperature that is equal to a user selected temperature plus a stage-specific offset, wherein the bake heating element provides a majority of heat output for one or more stages of the plurality of steam heating stages.

12. The method of claim 11, wherein the bake heating element provides a majority of heat output for one or more preheat stages of the plurality of steam heating stages.

13. The method of claim 11, wherein:

the plurality of steam heating stages comprises one or more preheating stages and one or more postheating stages, each of the one or more preheating stages targets a first predetermined temperature that is equal to a user selected temperature plus an associated preheat offset, each of the one or more postheating stages targets a second predetermined temperature that is equal to the user selected temperature plus an associated postheat offset, and the associated preheat and postheat offsets are different from each other.

14. The method of claim 11, wherein the plurality of steam heating stages comprises a postheat stage, wherein the processor operates the respective preset and timed duty cycle of the postheat stage according to hysteresis control using one or more predetermined temperature parameters.

15. The method of claim 11, wherein the plurality of steam heating stages comprises a preheat stage and a postheat stage, and the at least one fan includes a first convection fan that operates at a first variable speed during the preheat stage and postheat stage.

16. The method of claim 15, wherein the at least one fan further includes a second convection fan that operates at a second variable speed during the preheat stage and postheat stage.

17. The method of claim 11, wherein the at least one fan includes a first convection fan that operates continuously at a first speed during at least one stage of the plurality of steam heating stages.

18. The method of claim 17, wherein the at least one fan further includes a second convection fan that operates continuously at a second speed during the at least one stage.

19. The method of claim 11, wherein the plurality of steam heating stages comprises a first postheat stage selected after notification of insertion of the one or more food items, wherein the bake element provides a majority of heat output for the first postheat stage.

20. A non-transitory computer readable storage medium comprising computer program code instructions, being executable by a computer, for:

operating a steam heating mode including a plurality of steam heating stages, wherein each stage of the plurality of steam heating stages selectively controls a bake heating element and a fan according to a respective preset and timed duty cycle to generate steam and target a respective setpoint that is equal to a user selected temperature plus a stage-specific offset, and wherein one or more stages of the plurality of steam heating stages is configured to operate the bake heating element such that the bake heating element provides a majority of heat output for the one or more stages.

* * * * *